United States Patent [19]

Robertson

[11] Patent Number: 4,681,705

[45] Date of Patent: Jul. 21, 1987

[54] DECONTAMINATION OF RADIOACTIVELY CONTAMINATED LIQUIDS

[75] Inventor: Carlton E. Robertson, Wilmington, N.C.

[73] Assignee: Carolina Power & Light Company, Raleigh, N.C.

[21] Appl. No.: 787,501

[22] Filed: Oct. 15, 1985

[51] Int. Cl.[4] .......................... G21F 9/08; C02F 1/42; C09K 3/00

[52] U.S. Cl. .................................... 252/631; 210/682; 210/688; 210/723; 210/725; 252/626; 252/632; 252/635; 423/11; 423/15; 494/901

[58] Field of Search ............... 252/632, 628, 631, 626, 252/635; 210/682, 684, 688, 708, 723, 725, 2, 3, 11; 423/12, 15; 134/3; 208/187-188; 209/148, 199; 494/901, 37

[56] References Cited

U.S. PATENT DOCUMENTS

| | | | |
|---|---|---|---|
| 3,047,434 | 7/1962 | Bulat | 252/626 |
| 3,778,497 | 12/1973 | Deaton et al. | 252/626 |
| 3,836,625 | 9/1974 | Schäfer | 252/631 |
| 3,981,961 | 9/1976 | Bathellier et al. | 252/626 |
| 3,993,558 | 11/1976 | Prochazka et al. | 252/631 |
| 4,145,396 | 3/1979 | Grantham | 252/626 |
| 4,276,834 | 7/1981 | Bregulla et al. | 252/626 |
| 4,349,465 | 9/1982 | Krug et al. | 252/626 |
| 4,404,130 | 9/1983 | Fitoussi et al. | 252/631 |
| 4,437,999 | 3/1984 | Mayne | 210/748 |
| 4,460,500 | 7/1984 | Hultgren | 252/628 |
| 4,512,921 | 4/1985 | Anstine et al. | 252/631 |
| 4,537,666 | 8/1985 | Murray | 252/626 |

FOREIGN PATENT DOCUMENTS

| | | | |
|---|---|---|---|
| 0193499 | 11/1983 | Japan | 252/631 |

*Primary Examiner*—Stephen J. Lechert, Jr.
*Assistant Examiner*—Howard J. Locker
*Attorney, Agent, or Firm*—Bell, Seltzer, Park & Gibson

[57] ABSTRACT

A method of decontaminating mixtures of radioactively contaminated water and radioactively contaminated water-immiscible organic liquids to produce a decontaminated organic liquid which can be disposed of in a conventional manner. The method comprises separating a mixture of radioactively contaminated water and a radioactively contaminated water-immiscible organic liquid into a waste water fraction carrying metal radionuclides and an organic liquid fraction carrying metal radionuclides; decontaminating the waste water fraction; mixing the radioactively contaminated organic liquid fraction with a sufficient amount of an aqueous solution of a water-soluble chelating agent in a manner and for a time period sufficient for water-soluble metal-chelate complexes to form between the chelating agent and substantially all of the metal radionuclides carried by the organic liquid fraction; separating the aqueous solution from the organic liquid fraction thereby removing the water-soluble metal-chelate complexes containing substantially all of the radionuclides from the organic liquid fraction, making the organic liquid safely disposable by conventional methods; and decontaminating the aqueous solution.

26 Claims, No Drawings

DECONTAMINATION OF RADIOACTIVELY CONTAMINATED LIQUIDS

FIELD OF THE INVENTION

The present invention relates to the decontamination of radioactively contaminated liquids and particularly to the decontamination of mixtures of radioactively contaminated water and radioactively contaminated water-immiscible organic liquids formed during the operation of nuclear powered electric generating plants.

BACKGROUND OF THE INVENTION

In the electric power generating industry, nuclear powered electric generating plants are a potential source of a number of types of radioactively contaminated materials in addition to the fuel elements of a nuclear reactor and the primary materials in contact therewith. All such materials must be handled and disposed of in a manner consistent with both current technology and existing law.

One type of secondary materials which may become radioactively contaminated even though not in direct communication or contact with nuclear fuel or other high radiation elements, are the ordinary lubricating oils used in all types of machinery in many different applications and which are not necessarily specific to the nuclear industry. Usually the machinery in which such contaminated oil might be found is that which contains or pumps water or water solutions of various chemicals.

In the normal operation of such machinery, whether in nuclear powered electric generating plants, other types of generating plants, or totally unrelated industries, a common occurrence is the almost inevitable mixture of some amount of the lubricating oil used in the machinery with the water or other fluid which the machinery holds, transfers or pumps. Even in non-nuclear conventional industries, the effects of such mixtures must eventually be dealt with, usually by replacing or recycling the oil. Additionally, all lubricating oils have some limited operating lifetime, after which they must be replaced whether or not contaminated with other fluids.

In a nuclear powered electric generating plant, however, special problems arise. Because there are some pumps and other machinery in a nuclear power plant which must circulate coolant (usually water contaminated with radioactive corrosion products) within or closely adjacent the reactor vessel, the potential will always exist that some amount of radioactivity will be present in the water being handled or pumped. Consequently, any of this water which mixes with the lubricating oil in the machinery will radioactively contaminate the oil.

Most of the radioactive elements of more than minimal half-life are metals. The radioactive isotopes of such metals are often referred to as radionuclides and such will be the use of the word herein. The radionuclides most often encountered in waste lubricating oil are Mn-54, Co-58, Co-60, Cs-134 and Cs-137. In a nuclear powered electric generating plant these radionuclides are generally present due to minor defects in fuel cladding, neutron activation and small amounts of particulate matter introduced during the operation of the machinery or the transfer and storage of the oil.

Although the radioactivity levels in the waste lubricating oil from a nuclear powered plant are generally quite low—indeed lower than much naturally occurring radioactivity in everyday surroundings—because they are "man-made" isotopes, the law requires that they be classified as low level waste. Normally low level radioactive waste can be disposed of by shallow land burial, however, state and federal regulations prohibit the burial of radioactive liquids. Additionally, there is no state or federal law or regulation which defines a de minimus standard for waste lubricating oil. Thus, no matter how well waste lubricating oil is decontaminated, it must still be classified as low level waste and disposed of according to law.

Because of the lack of de minimus standards and the prohibition against burial of radioactive liquids, the operating utilities either solidify or absorb the oil in one of a variety of media and then bury the media in 55 gallon drums. This procedure is inefficient, uses tremendous amounts of space and is very expensive. Typically, only ten or twelve gallons of oil can be placed in each 55 gallon drum. At 1985 prices, disposing of such oil costs between $500 and $1200 per drum. This reflects not only the cost of solidifying the oil but also the intermediate handling and transportation of such drums to the single waste disposal site available for them in the United States. Currently there are 115 nuclear power plants in the United States, producing between 5,000 and 10,000 gallons per year of such waste oil, so that the problem represents a $20,000,000 to $60,000,000 per year industry wide economic problem.

Relatively few attempts have been made to decontaminate waste lubricating oil formed at nuclear power plants. Most of this work has focused on physical means of treatment such as filtration and separation. Particular studies have dealt with ultrafiltration (filtration on a molecular level) and treatment with mixtures of other materials such as acids and clays. Although these earlier methods represent legitimate separation techniques, they are all premised on the assumption that the decontamination of waste lubricating oil must be accomplished by separating the contaminated water from the oil, after which the oil would be decontaminated. In practice, however, merely separating the oil from the water, no matter how completely or efficiently, does not result in decontaminated lubricating oil and consequently such methods have been found to be unsatisfactory as ultimate disposal methods. Additionally, some of these methods are rather sophisticated and difficult to accomplish even in laboratories. Consequently they are unattractive for use on the scale necessary to address the industry-wide problem.

In developing the present invention, it has been discovered that the contaminated radioactivity, however, includes an organic component. It will thus be seen that the need exists for providing a means of dealing with the organic contaminants in waste lubricating oil and in addition attempting to merely dispose of the water-soluble inorganic component.

It is thus an object of the present invention to provide a method of decontaminating waste lubricating oil which eliminates the need for dispersing such oil into some solid medium, storing the dispersed oil in drums and shipping the drums long distances to a single disposal site.

It is a further object of this invention to provide a method of decontaminating waste lubricating oils so that the resulting decontaminated oil can be disposed of in a conventional manner, such as by combustion.

It is another object of this invention to provide a method of decontaminating waste lubricating oil which is technologically straightforward, uses existing production scale equipment and can treat large and small amounts of material in an equally beneficial fashion.

Finally, it is an object of this invention to provide a method of decontaminating both emulsions of aqueous solutions and contaminated waste lubricating oil and mixtures of particulate material with such emulsions such that the aqueous portions and the organic portions of such emulsions can both be ultimately disposed of in conventional manners rather than by storage in inefficient and expensive hazardous waste disposal sites.

SUMMARY OF THE INVENTION

The present invention comprises a method of decontaminating mixtures of radioactively contaminated water and radioactively contaminated water-immiscible organic liquids to produce a decontaminated organic liquid which can be disposed of in a conventional manner. The method comprises separating such mixtures into a waste water fraction carrying metal radionuclides and organic fraction likewise carrying metal radionuclides. The waste water fraction can be decontaminated in a conventional manner. The contaminated organic liquid fraction is then mixed with a sufficient amount of an aqueous solution of water-soluble chelating agent in such a manner and for such a time period sufficient for water soluble metal-chelate complexes to form between the chelating agent and the metal radionuclides carried by the organic liquid fraction. By separating the aqueous solution from the organic liquid fraction the water soluble chelate complexes are thereby removed from the organic liquid. Because these complexes contain substantially all of the radionuclides from the organic liquid fraction, the organic liquid fraction is decontaminated to a level appropriate for disposal by conventional methods.

DETAILED DESCRIPTION

As set forth earlier herein, prior to the present invention, it was believed that substantially all of the radioactivity present in waste lubricating oil was present in the aqueous portions of the oil/water emulsions which formed during the operation of certain typical types of machinery. Accordingly, it was similarly believed that the problem of decontaminating waste lubricating oil could be addressed simply by separating essentially pure oil from emulsions containing radioactive water. This has been found to be somewhat unsuccessful, however, as even after such separation techniques the resulting oil always has a significant enough radioactive contamination to require disposal as a radioactive low level waste.

In contrast to all of these prior assumptions and methods, the present invention has developed under the more proper discovery that radioactivity present in the mixtures of water and waste lubricating oil formed as byproducts of the operation of a nuclear power plant has an organic component. This organic component tends to be substantially associated with the oil rather than with the aqueous portion of the mixture and thus is not removed when oil and water are separated regardless of the sophistication or effectiveness of the particular separation technique. Accordingly, the present invention is a method which has been developed for attacking and then removing the radioactive component present in the organic material as well as that present in the inorganic material in waste lubricating oil.

The present invention is additionally novel in that contaminated oil is mixed with another material in order to accomplish the decontamination process. In almost all prior processes, it has been believed by those most familiar with the problem that physical separation techniques were required to decontaminate such oil and that any further mixing of such materials was an especially unattractive and unsatisfactory method of decontamination.

Although the invention can be broadly applied to the decontamination of water-immiscible organic liquids, the decontamination of mixtures of water and water-immiscible organic liquids and the decontamination of mixtures of either of the above with particulate material, the embodiment described herein will refer to the decontamination of mixtures of water and waste lubricating oil produced during the normal operations of nuclear powered electric generating plants.

According to the present invention, when any particulate matter is present in the waste oil, a first step in decontamination comprises separating the mixture of radioactively contaminated particulate material and a mixture of radioactively contaminated water and radioactively contaminated lubricating oil into an liquid mixture portion and a particulate portion. Such separation can be carried out by conventional means in a straightforward manner, such as filtration. The resulting particulate material, even if contaminated, can be disposed of as solid waste without the practical and regulatory problems set out earlier with respect to liquid waste.

The thus separated liquid mixture is then separated into a waste water fraction carrying metal radionuclides and an organic liquid fraction carrying metal radionuclides. In one preferred embodiment of the invention, the separation is accomplished in a centrifugal separator, one commercial embodiment of which is an Alfa Laval 103B centrifuge, or an equivalent product. In order to enhance the separation of the waste water fraction from the lubricating oil fraction, the mixture may additionally be heated, preferably to a temperature of about 180° F. Heating the mixture lowers the viscosity of the oil, improving its flow characteristics and enhancing the separation process. As in the case of the particulate material initially separated, the waste water fraction may be decontaminated by conventional methods such as selective precipitation or extraction which result in decontaminated water and low level solid waste which can be disposed of more conveniently than low level liquid waste.

It will be apparent to those familiar with the problem and the industry that the use of existing commercial technology and materials in the present invention makes the invention attractive and useful for current application on a wide scale.

In preferred embodiments of the invention, the separated contaminated oil fraction can be filtered at this stage to further remove any fine particulate material suspended therein which may not have been carried off in the separation from the waste water fraction.

The contaminated oil fraction is then mixed with a sufficient amount of an aqueous solution of a water-soluble chelating agent in a manner and for a time period sufficient for water-soluble metal-chelate complexes to form between the chelating agent and substantially all of the metal radionuclides carried by the organic liquid fraction. Appropriate chelating agents are those organic molecules which contain enough functional groups, two or more, located in such positions on the molecule that when the functional groups attach to the metal ion with which they complex, they surround the metal ion and form a ring. In a preferred embodiment of the invention, one appropriate chelating agent is ethylenediamine tetraacetic acid (EDTA). EDTA forms stable, water-soluble complexes with many metal ions, can potentially bond to metal ions at as many as six different sites, and tends to result in the formation of five-membered chelate rings.

Because the preferred embodiment of the invention relates to the decontamination of waste lubricating oil from a nuclear powered electric generating plant, the radionuclide which is characteristically most difficult to remove is Cobalt 60 (Co-60). EDTA is an especially attractive chelating agent for removing Cobalt 60, but the invention is equally applicable to situations in which other radionuclides need to be removed from either waste lubricating oil or some other water-immiscible organic liquid. In such circumstances, several other chelating agents may be appropriate. Typical chelating agents suitable for other radionuclides include the following: nitrilotriacetic acid, alpha-nitrosobeta-naphathol, 1,2-cyclohexanedionedioxime, disodium dihydrogen EDTA, ethylenediaminetetraacetate dihydrate, tetrasodiumethylenetiamine tetracetate, N-hydroxyethylethylenediaminetriacetic acid, and 4-(2-pyridylazo)-resorcinol.

In another embodiment of the invention, the aqueous solution containing the chelating agent may also include a water soluble inorganic precipitating agent. When the aqueous solution contains an inorganic precipitating agent, insoluble metal precipitates may form between the precipitating agent and some of the metal radionuclides which are not affected by the chelating agent. In such cases, the metal precipitates will separate from the organic liquid fraction along with the aqueous solution after which the metal precipitates may in turn be separated from the aqueous solution before the aqueous solution is otherwise decontaminated.

The invention thus provides a method whereby substantially all of the metal radionuclides may be removed from water immiscible organic liquids which contain some radionuclides which are more likely to complex with the chelating agent and which also contain other radionuclides which are less likely to form chelates but which will in turn be likely to precipitate out as insoluble salts of the inorganic precipitating agent.

Typical appropriate inorganic precipitating agents include the following: $NH_4OH$, $H_2S$, $(NH_4)_2S$, $(NH_4)_2HPO_4$, $H_2SO_4$, $H_2PtCl_6$, $H_2C_2O_4$, $(NH_4)_2MoO_4$, HCl, $AgNO_3$, $(NH_4)_2CO_3$, $NH_4SCN$, $NaHCO_3$, $HNO_3$, $H_5IO_6$, NaCl, $Pb(NO_3)_2$, $BaCl_2$, $NgCl_2$, and $NH_4Cl$.

It is to be understood that the aforementioned chelating agents and inorganic precipitating agents are illustrative of the types of materials known by those familiar with this art and that while some examples have been given, the invention is not limited to these particular examples.

As in the case of the initial separation of the mixture into an oil fraction and waste water fraction, the method of mixing the oil fraction with the chelating agent can give more satisfactory results. According to the present invention, it has been found that the mixing of the oil fraction with the aqueous solution of chelating agent can be best accomplished in a centrifuge similar to that used for separation, with the separation function of the centrifuge being switched over to a mixing function. Additionally, the mixing may be enhanced by heating the mixture during the mixing process.

Additionally, as is known to those familiar with chelating agents, the acidity of a solution affects the chelating capability of the chelating agent. In the embodiment preferred for the removal of Co-60 with EDTA, best results are obtained when the mixture is kept at a pH greater than 7 with most preferable results being obtained with a pH of about 10.5. For the removal of other metals with EDTA, Co-60 with other chelating agents or other metals with other chelating agents, the optimum pH can be determined based on the chemical characteristics of both the particular chelating agent and those of the particular radionuclide to be removed.

One further preferable characteristic of both the solution and the chelating agent is that the chelating agent selected be one which has a greater solubility in water than in the water immiscible organic liquid with which it is mixed. The relative solubility of EDTA in water and in oil is appropriate in this regard.

In the embodiment of the invention preferred for removing Co-60 from waste lubricating oil, an EDTA concentration of 0.125 Molar (M) and a solution to oil ratio of 8% have been found to be most satisfactory.

As presently best understood, of the radionuclides set out earlier which exist in the original waste mixtures of water and lubricating oil to be decontaminated, Co-60 generally dominates the total radioactivity of the oil fraction. Because waste lubricating oil, even when separated from an emulsion of waste water, always contains a residual measure of radioactivity, it is believed that the Co-60 forms organo-metallic complexes and other oil-soluble compositions which are not removed by any of the prior known techniques. According to the present invention, because EDTA is soluble both in water and in the oil component, Co-60 can be preferably encouraged to form EDTA complexes during the mixing process rather than forming or remaining a part of other organo-metallic compounds. When mixing is completed, the greater affinity of EDTA for water than for oil causes the EDTA to be preferably removed with the water and to carry with it the radioactive Co-60 originally picked up from the lubricating oil.

Accordingly, after mixing the next step in the present invention comprises separating the aqueous solution of the chelating agent from the lubricating oil. This also can be accomplished by centrifugal separation and the aqueous fraction which results can be disposed of in a conventional manner. If so desired, the oil fraction may be filtered one more time to remove any further fine particulate material which may have been introduced and not removed to this point.

The decontaminated lubricating oil, or other organic liquid, may then be disposed of in a conventional manner, preferably by burning. There are, of course, regulatory limits as to the amount of radioactivity that may be introduced into the atmosphere by the combustion of low level radioactive waste. One advantage of the present invention is that the method of decontamination set forth herein brings the contamination level of the oil to such a low level that combustion of the oil does not result in the release of any significant or prohibited amount of radioactivity into the atmosphere. To further reduce even these insignificant amounts, the waste oil decontaminated by the present method can be mixed with larger amounts of conventional fuel oil and burned in a conventional fuel boiler. It is to be understood that burning of waste lubricating oil decontaminated in the present manner is not the only conventional method of disposal and the scope of the invention or the claims is not to be considered as limited thereto.

It will be further understood that while the preferred embodiment of the present invention has been described with regard to the decontamination of waste lubricating oil produced at nuclear powered electric generating plants, the invention is equally applicable to the decontamination of a number of radioactively contaminated water immiscible organic liquids. As in the case of waste lubricating oil, these liquids may be found alone, in mixtures, in water emulsions, in mixtures of water emulsions and particulate material or with particulate material alone. All of these various situations may be addressed by the method of the present invention and are to be considered within the scope of the description and the claims herein.

Additionally, the foregoing embodiments are to be considered illustrative, rather than restrictive of the invention and those modifications which come within the meaning and range of equivalent of the claims are to be included therein.

That which is claimed is:

1. A method of decontaminating mixtures of radioactively contaminated water and radioactively contaminated water-immiscible organic liquids to produce a decontaminated organic liquid which can be disposed of in a conventional manner, said method comprising:

(a) separating a discontinuous mixture of radioactively contaminated water and a radioactively contaminated water-immiscible organic liquid in which the organic liquid comprises a continuous phase into a waste water fraction carrying metal radionuclides and an organic liquid fraction carrying metal radionuclides;

(b) decontaminating said waste water fraction;

(c) mixing said radioactively contaminated organic liquid fraction with a sufficient amount of an aqueous solution of a water-soluble chelating agent until water-soluble metal-chelate complexes form between said chelating agent and substantially all of said metal radionuclides carried by said organic liquid fraction;

(d) separating said aqueous solution from said organic liquid fraction thereby removing said water-soluble metal-chelate complexes containing substantially all of the radionuclides from said organic liquid fraction, making said organic liquid substantially free of radionuclides and safely disposable by conventional methods; and (e) decontaminating said aqueous solution.

2. A method according to claim 1 in which said water-immiscible organic liquid comprises waste lubricating oil from a nuclear powered electric generating plant.

3. A method according to claim 1 further comprising: heating said mixture of radioactively contaminated water and radioactively contaminated water-immiscible organic liquid, thereby enhancing said separation of said mixture into said radioactively contaminated water fraction and said radioactively contaminated organic liquid fraction.

4. A method according to claim 1 wherein said separating of said mixture into said waste water and organic liquid fractions comprises centrifugal separation.

5. A method according to claim 1 further comprising the step of filtering said radioactively contaminated organic liquid fraction after said separation from said mixture thereby removing any fine particulate suspended matter therefrom.

6. A method according to claim 1 wherein said mixing of said radioactively contaminated organic liquid fraction and said aqueous solution of a water soluble chelating agent comprises centrifugal mixing.

7. A method according to claim 1 wherein said manner of mixing includes heating the mixture of said organic liquid and said aqueous solution.

8. A method according to claim 1 further comprising maintaining the mixture of said radioactively contaminated liquid fraction and said aqueous solution of a water soluble chelating agent at a pH which enhances the chelation of the chelating agent with the radionuclides to be removed.

9. A method according to claim 1 further comprising maintaining the mixture of said radioactively contaminated organic liquid fraction and said aqueous solution of a water soluble chelating agent at a pH greater than 7.

10. A method according to claim 1 wherein said water soluble chelating agent has a greater solubility in water than in the water-immiscible organic liquid.

11. A method according to claim 1 wherein said separation of said aqueous solution from said organic liquid fraction comprises centrifugal separation.

12. A method according to claim 1 further comprising filtration of said separated organic liquid fraction.

13. A method according to claim 1 in which said chelating agent comprises ethylenediamine tetraacetic acid.

14. A method according to claim 1 further comprising disposing of said organic liquid in a conventional manner following said separation from said water-soluble metal-chelate complexes.

15. A method according to claim 14 in which said disposal comprises combustion of said organic liquid.

16. A method according to claim 1 wherein the mixture of water and radioactively contaminated water-immiscible organic liquid comprises an emulsion.

17. A method according to claim 1 wherein the water soluble chelating agent is selected from among the group consisting of: nitrilotriacetic acid, alpha-nitroso beta-naphthol, 1,2-cyclohexane dionedioxime, disodium dihydrogen EDTA, ethylene diaminetetraacetate dihydrate, tetrasodiumethylenediamine tetraacetate, N-hydroxethylethylene-diaminetriacetic acid, and 4-(2-pyridylazo)-resorcinol.

18. A method of decontaminating the organic liquid portions of mixtures of water and radioactively contaminated water-immiscible organic liquids to produce a decontaminated organic liquid which can be disposed of in a conventional manner, said method comprising:

(a) separating a discontinuous mixture of radioactively contaminated water and a radioactively contaminated water-immiscible organic liquid in which the organic liquid comprises a continuous phase into a waste water fraction and an organic liquid fraction carrying metal radionuclides;

(b) mixing said radioactively contaminated organic liquid fraction with a sufficient amount of an aqueous solution of a water-soluble chelating agent until water-soluble metal-chelate complexes form between said chelating agent and substantially all of said metal radionuclides carried by said organic liquid; and (c) separating said aqueous solution from said organic liquid fraction thereby removing said water-soluble metal-chelate complexes containing substantially all of the radionuclides from said organic liquid fraction, making said organic liquid substantially free of radionuclides and safely disposable by conventional methods.

19. A method of decontaiminating emulsions of radioactively contaminated water and radioactively contaminated lubricating oil to produce decontaminated lubricating oil which can be disposed of in a conventional manner, said method comprising:

(a) heating an emulsion of radioactively contaminated water and radioactively contaminated lubricating oil to a temperature of about 180° F.;
(b) centrifugally separating said heated emulsion into a radioactively contaminated waste water fraction carrying metal radionuclides and a radioactively contaminated oil fraction carrying metal radionuclides;
(c) decontaminating and disposing of said waste water fraction;
(d) filtering said radioactively contaminated oil fraction thereby removing any fine particulate suspended material therefrom;
(e) centrifugally mixing and heating said radioactively contaminated oil fraction with an aqueous solution of ethylenediamine tetraacetic acid in an amount and for a time period sufficient for water-soluble metal-chelate complexes to form between said ethylenediamine tetraacetic acid and substantially all of said metal radionuclides carried by said oil fraction while maintaining a pH of about 10.5;
(f) separating said aqueous solution from said oil fraction thereby removing said water-soluble metal-chelate complexes containing substantially all of the radionuclides from said oil fraction making said oil fraction safely disposable by conventional methods;
(g) decontaminating said water fraction thereby removing substantially all of the radionuclides therefrom; and
(h) disposing of said oil fraction in a conventional manner.

20. A method according to claim 19 further comprising combustion of said separated filtered decontaminated oil.

21. A method according to claim 20 in which said lubricating oil comprises radioactively contaminated lubricating oil formed during the normal operations of a nuclear powered electric generating plant.

22. A method according to claim 21 in which said amount of aqueous solution of ethylenediamine tetraacetic acid comprises a 0.125 molar solution added to form a mixture in which said aqueous solution is present 8% by weight in said lubricating oil.

23. A method of decontaminating mixtures of radioactively contaminated particulate material and emulsions of radioactively contaminated water and radioactively contaminated water-immiscible organic liquids, thereby producing a decontaminated organic liquid which can be disposed of in a conventional manner, said method comprising:

(a) separating a mixture of radioactively contaminated particulate material and an emulsion of radioactively contaminated water and a radioactively contaminated water immiscible organic liquid into an emulsion portion and a particulate portion;
(b) disposing of said particulate portion;
(c) separating said emulsion into a radioactively contaminated waste water fraction carrying metal radionuclides and a radioactively contaminated organic liquid fraction carrying metal radionuclides;
(d) mixing said radioactively contaminated organic liquid fraction with an amount of an aqueous solution of a water-soluble chelating agent in a manner and for a time period sufficient for water-soluble metal-chelate complexes to form between said chelating agent and substantially all of said metal radionuclides carried by said organic liquid;
(e) separating said aqueous solution from said organic liquid fraction thereby removing said water-soluble metal-chelate complexes containing substantially all of the radionuclides from said organic liquid;
(f) decontaminating said water fraction thereby removing substantially all of the radionuclides therefrom; and
(g) disposing of said oil fraction in a conventional manner.

24. A method of decontaminating mixtures of radioactively contaminated particulate material and emulsions of radioactively contaminated water and radioactively contaminated lubricating oil to produce decontaminated lubricating oil which can be disposed of in a conventional manner, said method comprising:

(a) separating a mixture of radioactively contaminated particulate material and an emulsion of radioactively contaminated water and radioactively contaminated lubricating oil into an emulsion portion and a particulate portion;
(b) disposing of said particulate portion;
(c) heating said emulsion of radioactively contaminated water and radioactively contaminated lubricating oil to a temperature of about 180° F.;
(d) centrifugally separating said heated emulsion into a radioactively contaminated waste water fraction carrying metal radionuclides and a radioactively contaminated oil fraction carrying metal radionuclides;
(e) filtering said radioactively contaminated oil fraction thereby removing any fine particulate suspended material therefrom;
(f) centrifugally mixing and heating said radioactively contaminated oil fraction with a sufficient amount of an aqueous solution of ethylenediamine tetraacetic acid for a time period sufficient for water-soluble metal-chelate complexes to form between said ethylenediamine tetraacetic acid and substantially all of said metal radionuclides carried by said oil fraction while maintaining a pH of about 10.5;
(g) separating said aqueous solution from said oil fraction thereby removing said water-soluble metal-chelate complexes containing substantially all of the radionuclides from said oil fraction;
(h) filtering said separated oil fraction; and
(i) decontaminating said aqueous solution thereby removing substantially all of the radionuclides therefrom; and
(j) disposing of said oil fraction in a conventional manner.

25. A method of decontaminating mixtures of radioactively contaminated water and radioactively contaminated water-immiscible organic liquids to produce a decontaminated organic liquid which can be disposed of in a conventional manner, said method comprising:

(a) separating a discontinuous mixture of radioactively contaminated water and a radioactively contaminated water-immiscible organic liquid in which the organic liquid comprises a continuous phase into a waste water fraction carrying metal radionuclides and an organic liquid fraction carrying metal radionuclides;

(b) decontaminating said waste water fraction;

(c) mixing said radioactively contaminated organic liquid fraction with a sufficient amount of an aqueous solution of a water-soluble chelating agent and an inorganic precipitating agent in a manner and for a time period sufficient for water-soluble metal-chelate complexes to form between said chelating agent and a portion of said metal radionuclides carried by said organic liquid fraction and for insoluble metal-salt precipitates to form between said inorganic precipitating agent and the remainder of said radionuclides carried by said organic liquid fraction;

(d) separating said aqueous solution and said metal-salt precipitate from said organic liquid fraction thereby removing said water-soluble metal-chelate complexes containing substantially all of the radionuclides from said organic liquid fraction, making said organic liquid substantially free of radionuclides and safely disposable by conventional methods;

(e) separating said metal-salt precipitates from said aqueous solution;

(f) decontaminating said aqueous solution; and (g) disposing of said organic liquid fraction in a conventional manner.

26. A method according to claim 25 wherein the inorganic precipitating agent is selected from among the group consisting of: $NH_4OH$, $H_2S$, $(NH_4)_2S$, $(NH_4)_2HPO_4$, $H_2SO_4$, $H_2PtCl_6$, $H_2C_2O_4$, $(NH_4)_2MnO_4$, $HCLAgNO_3$, $(NH_4)_2CO_3$, $NH_4SCN$, $NaHCO_3$, $HNO_3$, $H_5IO_6$, NaCl, $Pb(NO_3)_2$, $BaCl_2$, $MgCl_2$, and $NH_4Cl$.

* * * * *